US009064046B1

United States Patent
Cormier et al.

(10) Patent No.: US 9,064,046 B1
(45) Date of Patent: Jun. 23, 2015

(54) USING CORRELATED STACK TRACES TO DETERMINE FAULTS IN CLIENT/SERVER SOFTWARE

(75) Inventors: Richard Francis Cormier, Franklin, MA (US); Ruben Michel, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 1668 days.

(21) Appl. No.: 11/325,285

(22) Filed: Jan. 4, 2006

(51) Int. Cl.
*G06F 9/44* (2006.01)
*G06F 11/00* (2006.01)
*G06F 11/36* (2006.01)
*G06F 11/32* (2006.01)
*G06F 11/30* (2006.01)

(52) U.S. Cl.
CPC .............. *G06F 11/36* (2013.01); *G06F 11/362* (2013.01); *G06F 11/3636* (2013.01); *G06F 11/3644* (2013.01); *G06F 11/32* (2013.01); *G06F 11/3003* (2013.01); *G06F 11/324* (2013.01); *G06F 11/3006* (2013.01); *G06F 11/323* (2013.01); *G06F 11/30* (2013.01)

(58) Field of Classification Search
USPC ................. 717/124, 125, 127, 128, 130, 131; 718/100; 714/38
See application file for complete search history.

(56) References Cited

U.S. PATENT DOCUMENTS

| | | | | |
|---|---|---|---|---|
| 5,970,248 A * | 10/1999 | Meier | ........................... | 717/125 |
| 6,167,457 A * | 12/2000 | Eidson et al. | ................. | 719/328 |
| 6,324,683 B1 * | 11/2001 | Fuh et al. | ...................... | 717/124 |
| 6,760,903 B1 * | 7/2004 | Morshed et al. | .............. | 717/130 |
| 6,836,881 B2 * | 12/2004 | Beynon et al. | ................ | 717/128 |
| 6,954,922 B2 * | 10/2005 | Liang | ............................ | 717/130 |
| 7,039,833 B2 * | 5/2006 | Knuutila et al. | ................ | 714/38 |
| 7,200,651 B1 * | 4/2007 | Niemi | .......................... | 709/223 |
| 7,299,455 B2 * | 11/2007 | Anderson et al. | ............ | 717/127 |
| 7,441,234 B2 * | 10/2008 | Cwalina et al. | ............... | 717/128 |
| 7,469,362 B2 * | 12/2008 | Hudson et al. | ................. | 714/45 |
| 7,472,399 B2 * | 12/2008 | Conway | ........................ | 719/330 |
| 7,487,317 B1 * | 2/2009 | Fedorova et al. | ............ | 711/168 |
| 2002/0066071 A1 * | 5/2002 | Tien et al. | ..................... | 717/102 |
| 2005/0022208 A1 * | 1/2005 | Bolar et al. | ................... | 719/315 |
| 2005/0102673 A1 * | 5/2005 | DeWitt et al. | ................. | 718/100 |
| 2005/0132337 A1 * | 6/2005 | Wedel et al. | ................... | 717/128 |
| 2005/0183068 A1 * | 8/2005 | Cwalina et al. | ............... | 717/128 |
| 2006/0130001 A1 * | 6/2006 | Beuch et al. | ................... | 717/130 |
| 2006/0248514 A1 * | 11/2006 | Messmer et al. | ............. | 717/127 |
| 2007/0006154 A1 * | 1/2007 | Yang et al. | ..................... | 717/124 |

(Continued)

OTHER PUBLICATIONS

Colajanni et al, "The State of the Art in Locally Distributed Web-Server Systems", ACM Computing Surveys, vol. 34, No. 2, Jun. 2002, pp. 263-311.*

Amsaleg et al, "Garbage Collection for a Client-Server Persistent Object Store", ACM Transactions on Computer Systems, vol. 17, No. 3, Aug. 1999, pp. 153-201.*

(Continued)

*Primary Examiner* — Charles Swift
(74) *Attorney, Agent, or Firm* — Krishnendu Gupta; Gerald P. Kazanjian

(57) ABSTRACT

A method, apparatus and computer program product for using correlated stack traces to determine faults in client/server software is presented. Client/server software is executed. A client call stack is maintained on the client and a server call stack is maintained on the server. When an unexpected occurrence is detected while running the client/server software then the client call stack is collected, as is the server call stack. The client call stack and the server call stack are correlated to produce a correlated call stack and the correlated call stack is provided to a user.

20 Claims, 6 Drawing Sheets

(56) References Cited

U.S. PATENT DOCUMENTS

| | | | |
|---|---|---|---|
| 2007/0006170 A1* | 1/2007 | Hasse et al. | 717/131 |
| 2007/0038896 A1* | 2/2007 | Champlin et al. | 714/38 |
| 2007/0074170 A1* | 3/2007 | Rossmann | 717/127 |
| 2007/0150871 A1* | 6/2007 | Barsness et al. | 717/128 |
| 2007/0220495 A1* | 9/2007 | Chen et al. | 717/130 |
| 2008/0147853 A1* | 6/2008 | Anderson et al. | 709/224 |

OTHER PUBLICATIONS

Rabinovich et al, "DHTTP: An Efficient and Cache-Friendly Transfer Protocol for the Web", IEEE/ACM Transactions on Networking, Vol. 12, No. 6, December 2004, pp. 1007-1020.*

Lewamdowski, "Frameworks for Component-Based Client/Server Computing", ACM Computing Surveys, vol. 30, No. 1, Mar. 1998, pp. 1-25.*

* cited by examiner

USING CORRELATED STACK TRACES TO DETERMINE FAULTS IN CLIENT/SERVER SOFTWARE

BACKGROUND

Computer software applications may be run in a single computer system environment. In such an environment, a call stack may be used. A display of a call stack may be used as an aid for debugging applications. As a method is called, information about the method is placed on the call stack. The call stack includes multiple stack "frames" which represent each method that is executing on the current thread. The call stack may include one or more of a Module name, a Parameter name, a Parameter type, a Parameter value, a Line number and a Byte offset. In the event of an error, the call stack can be examined, and a determination made regarding the cause of the error.

Modern computer software applications are often distributed between computer systems and require the ability to access and exchange information with other remotely operating software applications. Such exchanges of data and access to functionality often take place over a computer network such as a local area network (LAN) or a wide area network (WAN) such as the Internet.

In a distributed system, such as a client/server based system, each distributed member has its own respective call stack. Thus, in a client/server distributed system, the client thread has its own call stacks (client call stacks) and the server thread has its own call stacks (server call stacks).

SUMMARY

Conventional distributed systems, such as those explained above, suffer from a variety of deficiencies. One such deficiency is that in a distributed system, a stack trace stops at the boundary between the client and the server. In the event of an error, it is difficult to correlate the server call stack with the client call stack, since typically there are multiple processes and calls going on.

Embodiments of the invention significantly overcome such deficiencies and provide mechanisms and techniques that provide a method for correlating a client call stack with a server call stack to provide a correlated call stack which is useful for determining causes of unexpected occurrences (errors, exceptions or the like) in a distributed computing environment.

In a particular embodiment of a method of using stack traces to determine faults in client/server software, the method begins by executing the client/server software. A client call stack is maintained on the client and a server call stack is maintained on the server. When an unexpected occurrence is detected while running the client/server software, the client call stack is collected, as is the server call stack. The client call stack and the server call stack are correlated to produce a correlated call stack and the correlated call stack is provided to a user.

Other embodiments include a computer readable medium having computer readable code thereon for using stack traces to determine causes of unexpected occurrences in client/server software. The medium includes instructions for executing the client/server software. The medium further includes instructions for maintaining a client call stack on the client and for maintaining a server call stack on the server. Additionally, the medium includes instructions for detecting an unexpected occurrence of an error while running the client/server software. Further, the medium includes instructions for collecting the client call stack, for collecting the server call stack, and for correlating the client call stack with the server call stack to produce a correlated call stack. The medium may further include instructions for providing the correlated call stack to a user.

Still other embodiments include a distributed system, configured to process all the method operations disclosed herein as embodiments of the invention. In such embodiments, the distributed system includes client device and a server device, each of which includes a memory system, a processor, communications interface in an interconnection mechanism connecting these components. The memory system is encoded with a process that provides using stack traces to determine causes of unexpected occurrences in client/server software as explained herein that when performed (e.g. when executing) on the processor, operates as explained herein within the client and server devices to perform all of the method embodiments and operations explained herein as embodiments of the invention. Thus any computerized devices that performs or are programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing for using stack traces to determine causes of unexpected occurrences in client/server software as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by EMC Corporation of Hopkinton, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
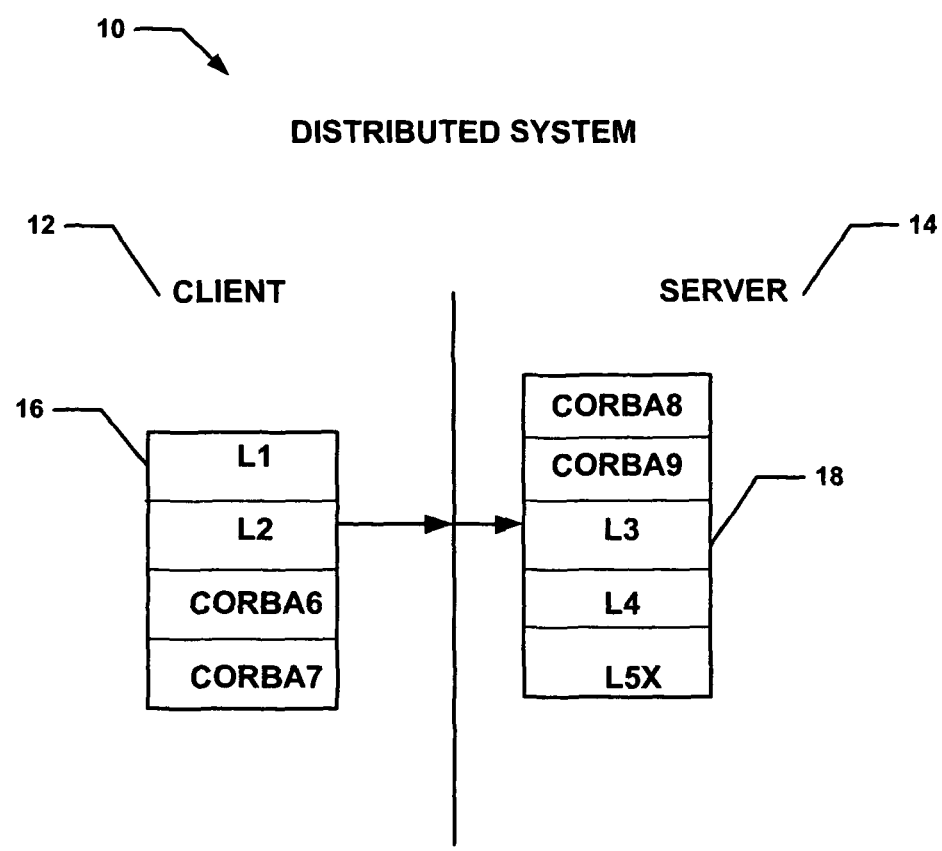
FIG. 1 illustrates a high-level block diagram of a client/server system showing respective call stacks.

A distributed system 10 is shown in FIG. 1. The distributed system includes a client 12 and a server 14. Client/server software is executed by system 10. The client 12 may request data from server 14 as part of the execution of the client/serve software. As part of the execution of the software, call stacks are used. Client 12 has a client call stack 16 and server 14 has a server call stack 18. A single operation by the system may result in several frames being pushed onto the stacks. For example, in FIG. 1, an operation has resulted in frames L1 and L2 being pushed onto the client call stack and further operation has resulted in frames L3 and L4 being pushed on the server call stack 18. Frame L5 was pushed onto the server call stack 18, and an unexpected occurrence, such as an exception, an error condition, or a fault condition, was encountered by the server 18, as indicated by the X shown in stack frame L5 of server call stack 18. On the client side, once the unexpected occurrence has occurred, the client has no idea what happened or how to determine a possible route cause of the unexpected occurrence.

Figure 2:
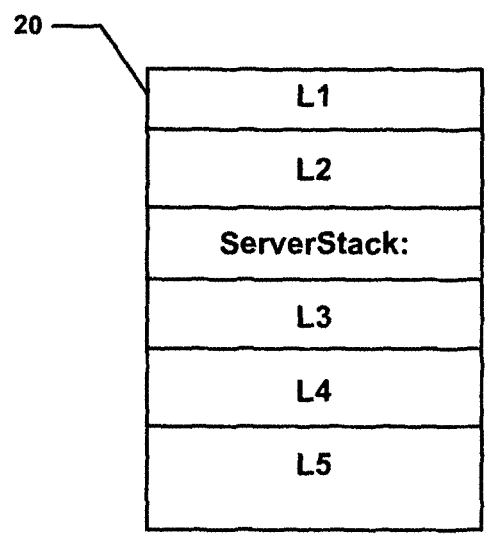
FIG. 2 illustrates a correlated call stack in accordance with embodiments of the present invention.

Referring now also to FIG. 2, when the unexpected occurrence happens, by way of the present invention, the client call stack 16 is collected as is the server call stack 18. A correlation operation is performed on the two call stacks to produce a correlated call stack 20. Correlated call stack 20 includes frames L1 and L2 from client call stack 16, a ServerStack frame, and frames L3, L4 and L5 from client call stack 18. The correlated call stack 20 is presented to the user, and can be used to help determine a route cause of the unexpected occurrence.

Figure 3:
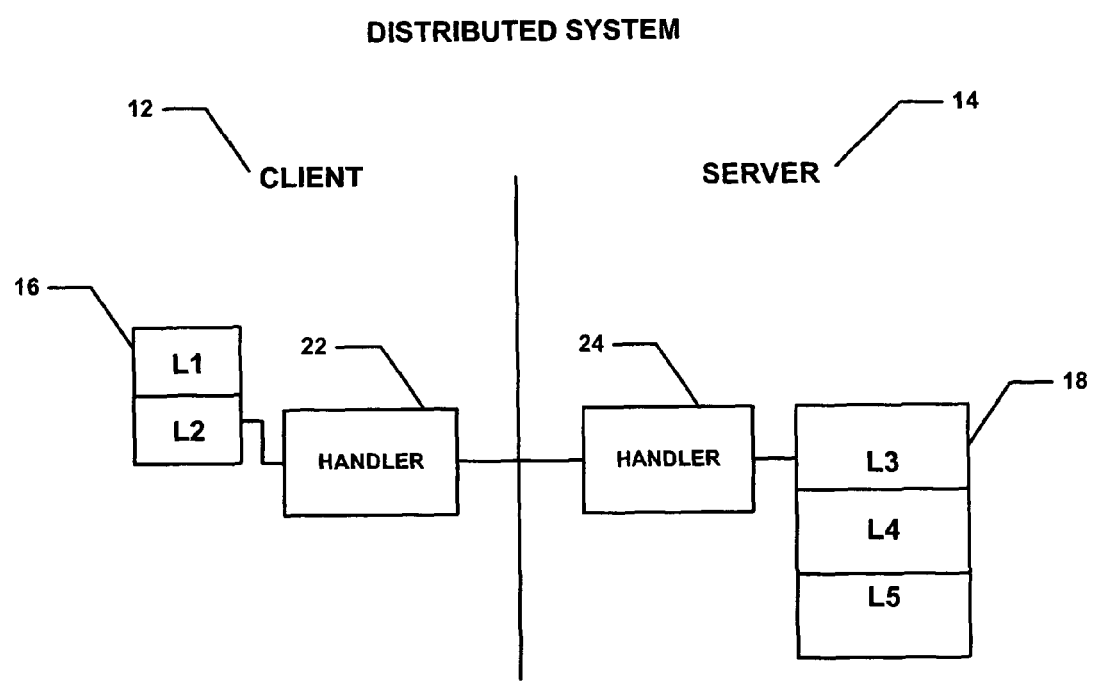
FIG. 3 illustrates a distributes system including handlers for using stack traces to determine causes of unexpected occurrences in client/server software.

A particular embodiment of a system for using stack traces to determine causes of unexpected occurrences is shown in FIG. 3. The system includes a client 12 and a server 14, as well as a client call stack 16 and a server call stack 18. The client further includes a handler 22 which is aware of the client call stack 16 and the server 14. The server 14 also includes a handler 24 which is aware of the server call stack 18 and packages its knowledge of the server stack into a data structure that the client call handler will interpret upon receipt..

Due to the complexities and varying mechanisms of implementing functionality and data formats within modern software applications, software developers often employ software commonly referred to as "middleware" that provides a standardized mechanism for the exchange of information and access to functionality between two or more remotely operating software programs. Middleware is generally connectivity software that consists of a set of enabling services that allow multiple processes running on one or more machines to interact across a network.

Middleware allows a software developer to create a software application using calls to a middleware-specific application programming interface or API in order to insulate the software developer from having to know the details of how to access the remotely operating software application and associated remote data structures or objects. By incorporating a set of middleware-specific function calls into the application under development, the software developer relies on the middleware transport and data access mechanisms and does not need to be concerned with details such as creation of connections to remote computer systems. Middleware is thus software that connects otherwise separate applications or separate products and serves as the glue between the applications. Middleware is thus distinct from import and export features that may be built into one of the applications. Developers often refer to middleware "plumbing" because it connects two sides of an application and passes data between them. For example, there are a number of middleware products that link a database system to a web server. This allows a user application to request data from the database using forms displayed on a web browser, and it enables the web server to return dynamic web pages based on the user application's requests.

One example of commonly used middleware architecture is called CORBA. CORBA is an acronym for Common Object Request Broker Architecture. The CORBA environment is an industry standard that is maintain by Object Management Group, Inc. (OMG) of Needham, Mass., USA. As described on OMG's web site, CORBA provides a vendor-independent architecture and infrastructure that computer applications use to work together over data networks. Using standardized protocols, a CORBA-based program from any vendor, on almost any computer, operating system, programming language, and network, can interoperate with a CORBA-based program from the same or another vendor, on almost any other computer, operating system, programming language, and network.

For each object type a developer using middleware such as CORBA defines an interface in an OMG Interface Description Language (IDL). The interface is a syntax part of a contract that a server object offers to client programs that invoke functionality and access data within that server object. Any client that wants to invoke an operation on the object must use this IDL interface specification (i.e., object specification) to specify the operation it wants to perform, and to marshal arguments (i.e., parameters or data) that the client sends and receives from the server for access to that object. When the invocation reaches the target object, the same interface definition is used there to unmarshal the arguments so that the object can perform the requested data processing operation with the arguments. The interface definition is then used to marshal the results for their trip back to the client, and to unmarshal them when they reach the client destination.

A conventional IDL interface definition is independent of a selected programming language, but maps to all of the popular programming languages via industry standards. As an example, there are standardized mappings from IDL to C, C++, Java, COBOL and other languages.

The use of a middleware-specific interface, such as a CORBA call, that is separate from the middleware implementation, enabled by the IDL, is one essence of middleware such as CORBA and explains how conventional middleware enables interoperability between applications. The interface to each object using a conventional middleware platform is defined very strictly. However, CORBA and other middleware platforms hide the implementation of an object (i.e., its running code and its data) from the rest of the system (that is, middleware encapsulates the implementation) behind a boundary that the client application may not cross. Clients access objects only through their advertised CORBA (or other middleware-specific) interface, invoking only those CORBA (or other middleware) operations that the object exposes through its IDL interface, with only those CORBA (or other middleware) parameters (input and output) that are included in the invocation.

Client/server software is executed by system 10. The client 12 may request data from server 14 as part of the execution of the client/serve software. As part of the execution of the software, call stacks are used.

In this embodiment, when an unexpected occurrence occurs, the client call stack 16 is collected as is the server call stack 18. In this example, the unexpected occurrence comprises an exception. A correlation operation is performed on the two call stacks to produce a correlated call stack. The collecting of the client call stack, the collecting the server call stack and the correlating the client call with the server call stack comprises overriding a default stack data collection mechanism with a custom stack data collection mechanism including the client call stack and the server call stack.

The custom stack data collection mechanism may be written in middleware or may preferably be written into a generative aspect-oriented layer. **.

In a preferred embodiment, the handlers may be inserted into the client/server environment by use of generative aspect-oriented techniques. Configurations herein disclose a system and method in a software build system for emitting a handler into a client and/or server component to access interfaces of client and/or server components. The system of the invention provides a generation tool that emits a method declaration and further emits the method's definition in a handler. With application of the invention, locating a mediator is delegated to a server infrastructure, and the names of the sought after interface and the required component are emitted.

The custom stack collection mechanism includes mapping an exception in a first protocol on the server into an exception in a second protocol, sending the exception in a second protocol to the client, receiving the exception in a second protocol at the client, and mapping the exception in a second protocol back to the exception in a first protocol.

The mapping an exception in a first protocol on the server into an exception in a second protocol and the sending the exception in a second protocol to the client is performed by the server side handler 24. The receiving the exception in a second protocol at the client and the mapping the exception in a second protocol back to the exception in a first protocol is performed by a client side handler 22. In this example, the first protocol comprises Java and the second protocol comprises Corba.

The stack trace created in a server process will be displayed in the client process. In a particular embodiment, this is done by including the stack trace elements as strings in a CORBA exception object and overriding the methods for displaying stack traces in an adapter object on the client side. This involves overriding the standard behavior of showing only the stack trace in the conventional process. The override allows the code that handles the error to see the multiprocess stack trace without having to do anything differently than it would to see the stack from the local process only.

As an example, there is an exception class ObjectNotFoundException that can be thrown by a method with the function of looking up an object in a repository. The method's signature is as follows:

IManagedObject lookupObj(IMoId id) throws ObjectNotFoundException If an implementation of this method was called locally (not from code running in a different process), it might look like this:

```
1    com.emc.eccapi.objmodel.model.ObjectNotFoundException: Could
     not find object with id EccBasedId:ecctype=com
2        at com.emc.eccapi.query.ObjLookupQueryServiceAdapter.
         lookupObj(ObjLookupQueryServiceAdapter.java:25)
3        at SymmGetter.getASymm(SymmGetter.java:59)
4        at SymmGetter.runTest(SymmGetter.java:45)
5        at SymmGetter.main(SummGetter.java:22)
```

By way of the presnet invention, virtually the same stack trace is presented in the case whether the instance of ObjLookupQueryServiceAdapter from stack trace line 1 is running in the same process as the SymmGetter instance in lines 3 to 5 (with the stack trace of middleware calls inserted between lines 2 and 3.)

The resulting stack trace might be something like:

```
1    com.emc.eccapi.bridgeutil.
     BridgeExceptionUtil$ObjNotFoundIdlAdapter:
     com.emc.eccapi.objmodel.model.ObjectNotFoundException: C
2        at com.emc.eccapi.bridgeutil.BridgeExceptionUtil.
         convert(BridgeExceptionUtil.java:98)
3        at com.emc.eccapi.queryadp.ObjLookupClientBridgeAdapter.
         lookupObj(ObjLookupClientBridgeAdapter.java:44)
4        at SymmGetter.getASymm(SymmGetter.java:59)
5        at SymmGetter.runTest(SymmGetter.java:45)
6        at SymmGetter.main(SymmGetter.java:22)
7    Remote stack:
8        com.emc.eccapi.objmodel.model.ObjectNotFoundException:
         Could not find object with id EccBasedId:ecctype=com.emc.ecc.dl.
9        at com.emc.eccapi.query.ObjLookupQueryServiceAdapter.
         lookupObj(ObjLookupQueryServiceAdapter.java:25)
10       at com.emc.eccapi.toplinkdb.toplinkdbCoClass.toplinkdb__
         ToplinkLookup__lookupObj(toplinkdbCoClass.java:157)
11       at com.emc.eccapi.bridge.toplinkdb.toplinkdbCoBridge.
         toplinkdb__ToplinkLookup__lookupObj(toplinkdbCoBridge.
         java:1200)
12       at com.emc.eccapi.toplinkdb.__toplinkdb__
         ToplinkLookupServant.lookupObj(__toplinkdb__
         ToplinkLookupServant.java:63)
13       at com.emc.eccapi.toplinkdb.ToplinkLookupPOA._
         invoke(ToplinkLookupPOA.java:146)
14       at org.jacorb.poa.RequestProcessor.invokeOperation(Unknown
         Source)
15       at org.jacorb.poa.RequestProcessor.process(Unknown Source)
16       at org.jacorb.poa.RequestProcessor.run(Unknown Source)
```

The second stack trace contains all of the elements of the first stack trace, plus some stack elements that are introduced by the middleware. It would even be possible for the invention to present the stack without the middleware lines to further simplify diagnostic activity, with a resulting stack trace something like:

```
1    com.emc.eccapi.objmodel.model.ObjectNotFoundException:
     Could not find object with id EccBasedId:ecctype=com
2    Remote stack:
3        at com.emc.eccapi.query.ObjLookupQueryServiceAdapter.
         lookupObj(ObjLookupQueryServiceAdapter.java:25)
4    Local stack:
5        at SymmGetter.getASymm(SymmGetter.java:59)
6        at SymmGetter.runTest(SymmGetter.java:45)
7        at SymmGetter.main(SymmGetter.java:22)
```

For the remote interface, in a particular implementation, CORBA is used as the middleware and CORBA IDL as the interface definition language. The IDL operation (which corresponds to a remotely available method) declares that it throws an exception that contains data about the stack trace in the server. The exception declaration in IDL is as follows:

```
struct ExceptionDataIDl {
   string msg;
   sequence<string> causeStack;
}; // struct ExceptionDataIdl
```

```
exception ObjNotFoundIdl
{
   string id;
   ExceptionDataIdl data;
}; // exception ObjNotFound
```

The exception type expressed in IDL is ObjNotFoundIdl. It carries a data structure with in it of type ExceptionDataIdl, which in turn contains a sequence of strings, one string per server stack trace element.

The operation is declared as follows:

```
MoGetter lookupObj(in string id)
   raises (ObjNotFoundIdl);
```

Each of the IDL exception ObjNotFoundIdl and operation lookupObj has a corresponding Java exception and method, respectively.

For the server-side processing, code in the server catches the Java exception, ObjectNotFoundException and creates and throws the corresponding IDL exception ObjNotFoundIdl. The server code that catches the Java exception and throws the IDL exception is shown below.

```
162    } catch (ObjectNotFoundException ex) {
163       IExceptionDataIdl ExData = __create_ExceptionDataIdl( );
164       exData.setMsg(th.toString( ));
165       exData.setCauseStack(EccApiRemoteException.
           getStackAsStringArray(th));
166       ObjNotFoundIdl exIdl =
           __create_objmodel_model_ObjNotFoundIdl( );
167       exIdl.setData(exData);
168       exIdl.setId(idStr);
169       throw exIdl;
```

Line 162 is used to catch the Java exception ObjectNotFoundException. Line 163 is used to create the structure that will contain stack trace data and other data for the exception (in this case, it uses a bridge factory and creates a bridge as per our previous patents, although it could as easily create the CORBA construct). Line 164 sets the message of the data structure with the message of the Java exception., and line 165 sets the stack trace strings of the data structure using a utility method for this purpose. Line 166 creates the exception that will be thrown across the network by the bridges and middleware (the remote exception). Line 167 sets the stack trace and message data of the remote exception. Line 168 sets other information about the exception (in this case, the id of the object that could not be found). Line 169 throws the remote exception.

The client side is responsible for catching the remote exception and rethrowing it as the original Java exception thrown by the server, but with the behavior that the full stack, including the stack from the server, is displayed from methods that have this responsibility.

The client code creates an adapter exception for this purpose. The code for this adapter exception is below.

```
182    private static class ObjNotFoundIdlAdapter
183       extends ObjectNotFoundException
184    {
185       private EccApiRemoteException m_ex;
186
187       ObjNotFoundIdlAdapter(
188          com.emc.eccapi.bridge.objmodel.model.ObjNotFoundIdl
             exIdl)
189       {
190          super(exIdl.getData( ).getMsg( ). exIdl);
191          m_ex = new EccApiRemoteException(
192             exIdl, exIdl.getData( ).getCauseStack( ));
193       }
194
195       public void printStackTrace( ) {
196          printStackTrace(System.out);
197       }
198
199       public void printStackTrace(PrintStream out) {
200          print StackTrace(new PrintWriter(out));
201       }
202
203       public void printStackTrace(PrintWriter out) {
204          super.printStackTrace(out);
205          m_ex.printRemoteStack(out);
206       }
207    }
```

The exception adapter ObjNotFoundIdlAdapter extends the class ObjectNotFoundException. This allows code that declares that it throws ObjectNotFoundException to throw an instance of this exception using the object-oriented property of extension.

This code has a constructor at line 187 that creates an instance related data structure EccApiRemoteException for the purpose of holding the remote stack trace strings. The printStackTrace methods at lines 195 and 199 delegate the implementation of this call to the method of the same name at line 203. This call in turn prints the client-side stack on line 204 and the server stack on line 205. The code illustration is completed by including the class EccApiRemoteException below:

```
11     public class EccApiRemoteException extends EccApiException
12     {
13        private String[ ] m_remoteStack = new String[0];
14
15        public EccApiRemoteException(Throwable cause, String[ ]
          remoteStack) {
16           super(cause);
17           m_remoteStack = remoteStack;
18        }
19
20        public void printStackTrace( ) {
21           printStackTrace(System.out);
22        }
23
24        public synchronized void printStackTrace(PrintWriter out) {
25           super.printStackTrace(out);
26           EccApiRemoteException.printStackFromStringArray(m_
             remoteStack,out);
27        }
28
29        public synchronized void printStackTrace(PrintStream out) {
30           printStackTrace(new PrintWriter(out));
31        }
32
33        public static void printStackFromStringArray(
```

```
34          String[ ] stack, PrintWriter out)
35      {
36          if (stack.length > 0 ) {
37              StringBuffer buf = new StringBuffer( );
38              buf.append(" Remote stack:\n");
39              for (int i = 0; i < stack.length; i++) {
40                  buf.append(" ");
41                  buf.append(stack[i]);
42                  buf.append('\n');
43              }
44              out.println(buf.toString( ));
45          }
46          out.flush( );
47      }
48
49      public synchronized void printRemoteStack(PrintWriter out) {
50          printStackFromStringArray(m_remoteStack, out);
51      }
52
53      private static void addStackAsString(Throwable th,
            Collection coll) {
54          StackTraceElement[ ] stack = th.getStackTrace( );
55          for (int i = 0; i < stack.length; i++) {
56              coll.add(" at "+ stack[i].toString( ));
57          }
58
59          th = th.getCause( );
60          if (th != null) {
61              coll.add(" Caused by "+ th.toString( ) + ": ");
62              addStackAsString(th, coll);
63          }
64      }
65  }
```

Figure 4A:
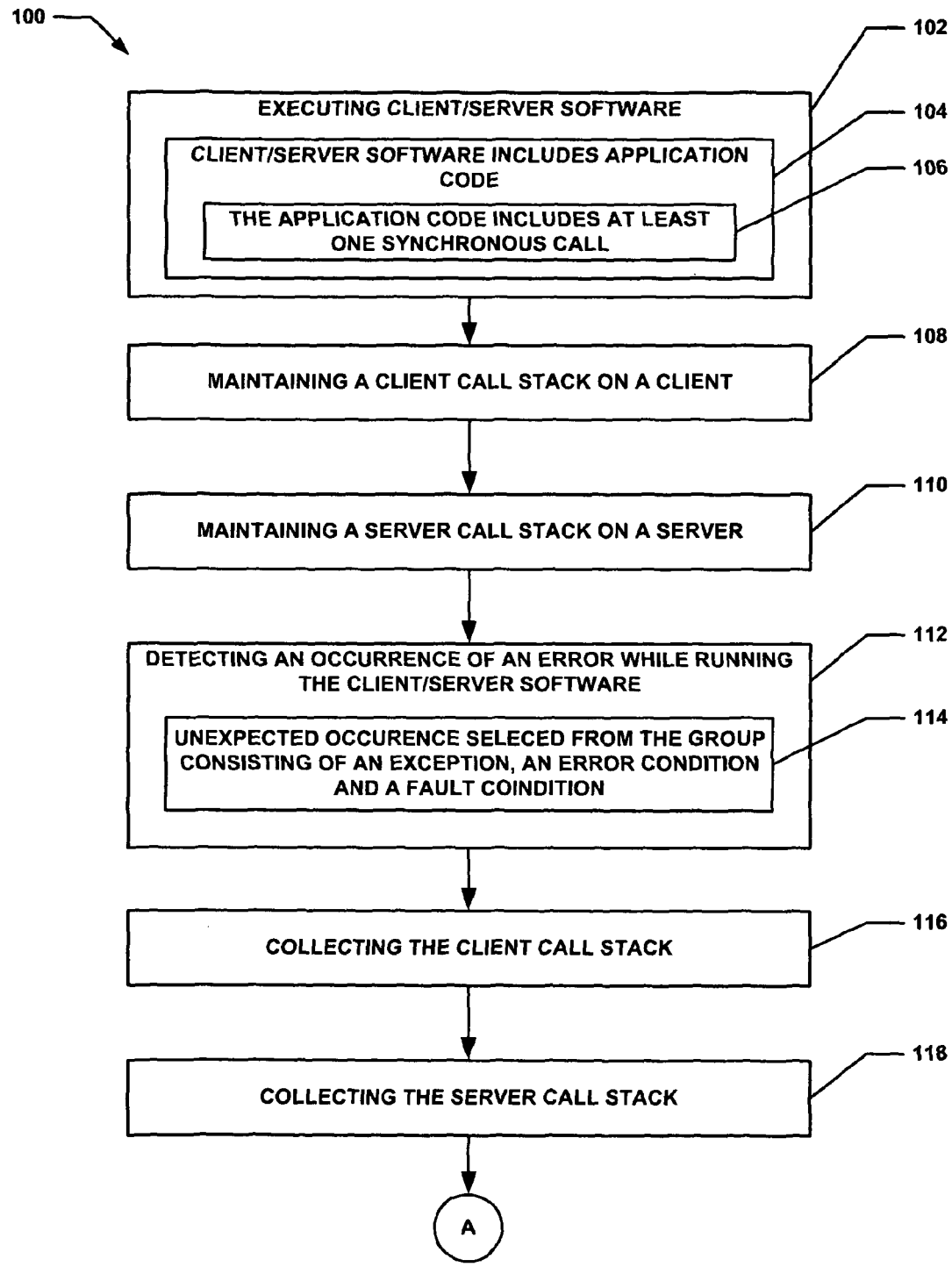
FIGS. 4A and 4B illustrate a flow diagram for a particular embodiment of a method for using stack traces to determine faults in client/server software.
Figure 4B:
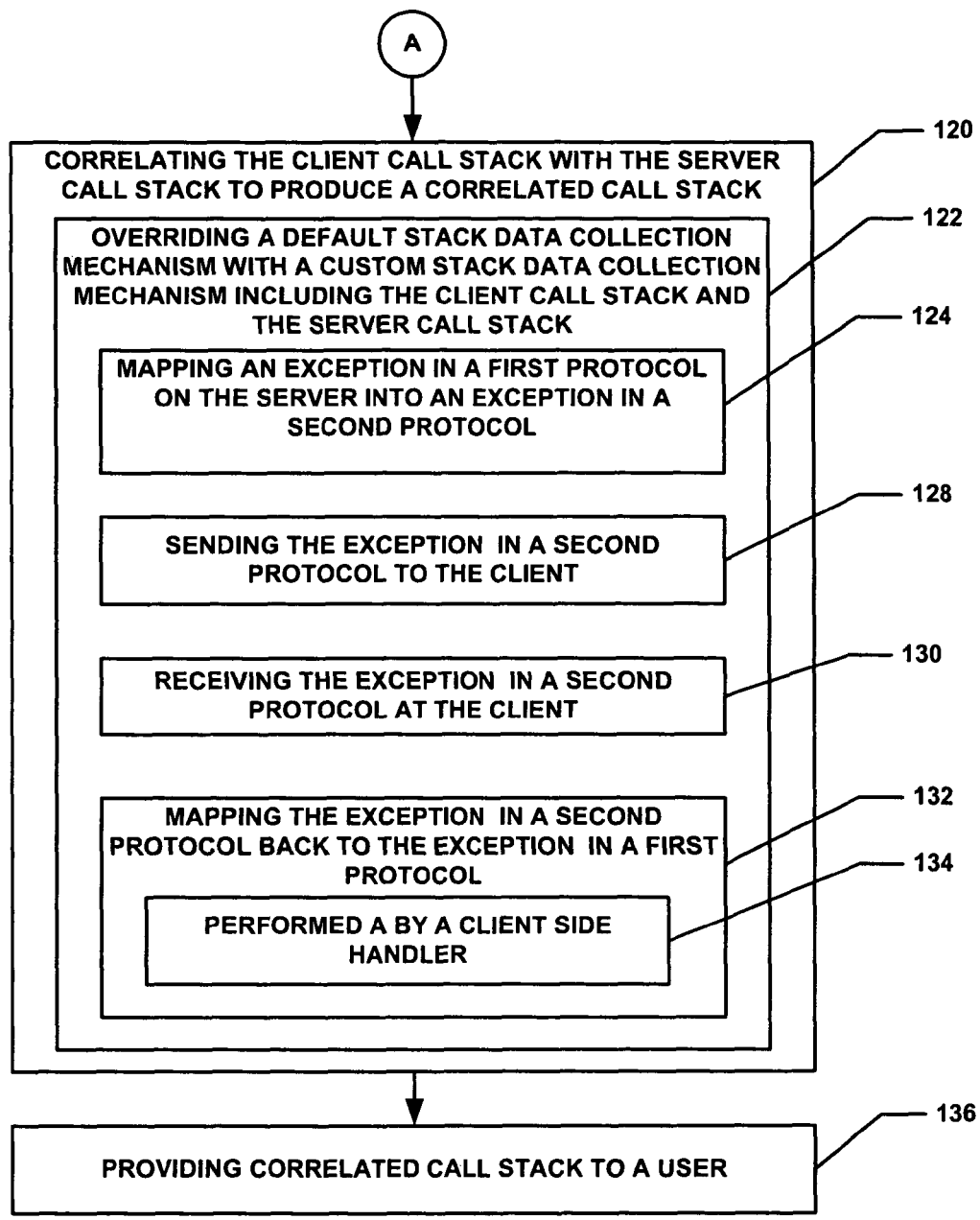

A flow chart of the presently disclosed method is depicted in FIGS. 4A and 4B. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 4A and 4B, a method 100 of using stack traces to determine faults in client/server software begins with processing block 102 which discloses executing client/server software. As recited in processing block 104 the client/server software includes application code, and as disclosed in processing block 106, the application code includes at least one synchronous call.

Processing blocks 108 and 110 respectively state maintaining a client call stack on the client, and maintaining a server call stack on the server. Processing block 112 recites detecting an unexpected occurrence o while running the client/server software. This unexpected occurrence may comprise an exception, an error condition or a fault, as disclosed in processing block 114.

Upon detection of the error, processing block 116 is performed, which recites collecting the client call stack. Similarly, processing block 118 is also performed, which states collecting the server call stack.

Processing block 120 discloses correlating the client call stack with the server call stack to produce a correlated call stack. As discloses in processing block 122 this includes overriding a default stack data collection mechanism with a custom stack data collection mechanism including the client call stack and the server call stack. As stated in processing block 124, overriding a default stack collection mechanism with a custom stack data collection mechanism includes mapping an exception in a first protocol on the server into an exception in a second protocol. Processing block 126 discloses that this is performed by a server side handler. Processing block 128 states sending the exception in a second protocol to the client, and processing block 130 recites receiving the exception in a second protocol at the client. The correlating continues with processing block 132 which recites mapping the exception in a second protocol back to the exception in a first protocol, which is performed by a client side handler as recited in processing block 134.

Processing block 136 recites providing the correlated call stack to a user. This aids the user in determining a root cause of the unexpected occurrence.

Figure 5:
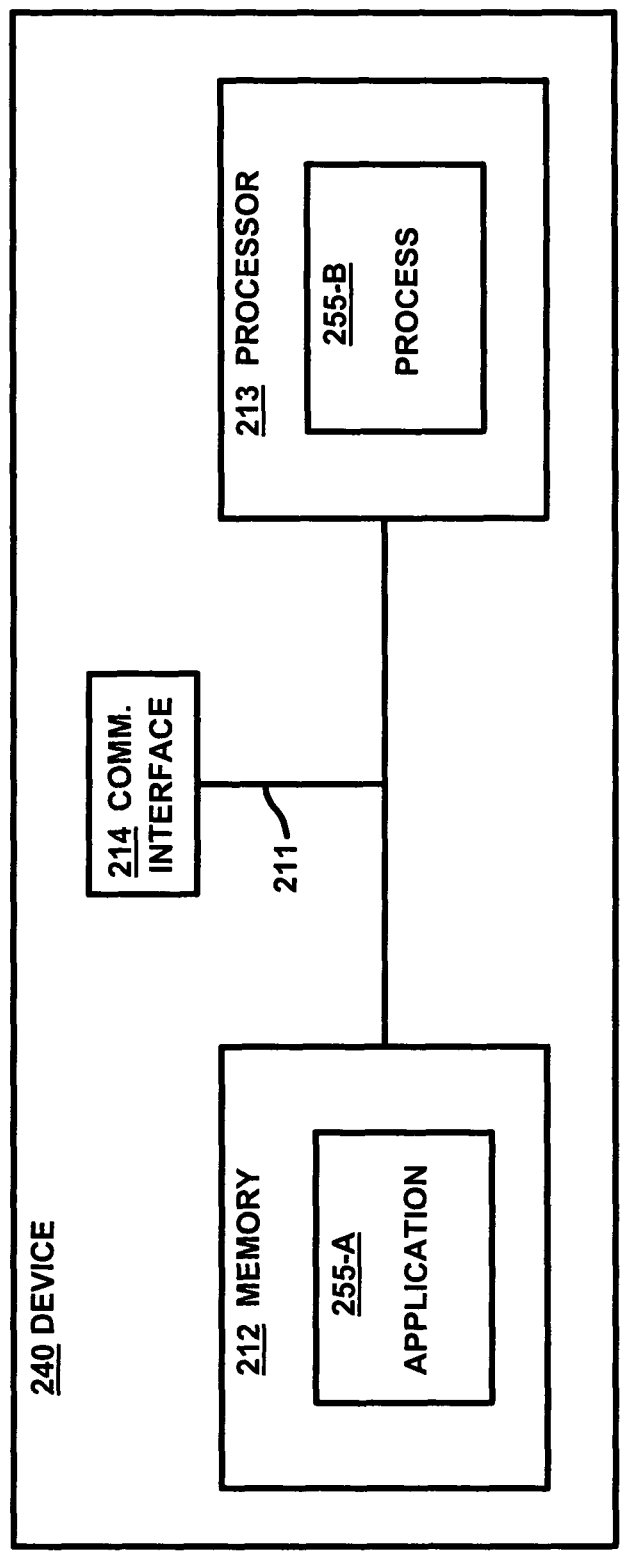
FIG. 5 illustrates an example computer system architecture for a computer system that uses stack traces to determine faults in client/server software in accordance with embodiments of the invention.

FIG. 5 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding agent process 255-B. In other words, the agent process 255-B represents one or more portions of the agent application 255-A performing within or upon the processor 213 in the computer system. It is to be understood that the agent 255 operate as explained in former examples are represented in FIG. 5 by the agent application 255-A and/or the process 255-B.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method comprising:
executing, via at least one processor device, client/server software application code in a distributed system;
maintaining a client call stack on a client comprising at least one client stack frame pushed onto the client call stack by operation of methods of client/server software executing on respective client threads;
maintaining a server call stack on a server comprising at least one server stack frame pushed onto the server call stack by operation of methods of client/server software executing on respective server threads;
detecting an unexpected occurrence in the execution of the client/server software application code executing on the at least one processor device in the distributed system;
collecting the client call stack from the client,
collecting the server call stack from the server;
correlating the client call stack with the server call stack to produce a correlated call stack comprising a first sequence of frames from the client call stack, a second sequence of frames from the server call stack, and a stack frame indicating a partition between the first sequence of frames from the client call stack and the second sequence of frames from the server call stack;
providing the correlated call stack to a user; and
using the correlated call stack to determine a root cause of the unexpected occurrence detected in the execution of the client/server software application code in the distributed system.

2. The method of claim 1 wherein collecting the client call stack from the client, collecting the server call stack from the server, and correlating the client call with the server call stack comprising a first sequence of frames from the client call stack, a second sequence of frames from the server call stack, and a stack frame indicating a partition between the first sequence of frames from the client call stack and the second sequence of frames from the server call stack comprises overriding a default stack data collection mechanism with a custom stack data collection mechanism including the client call stack and the server call stack.

3. The method of claim 2 wherein overriding a default stack collection mechanism with a custom stack data collection mechanism including the client call stack and the server call stack comprises:
mapping an exception in a first protocol on the server into an exception in a second protocol;
sending exception in the second protocol to the client;
receiving the exception in the second protocol at the client; and
mapping the exception in the second protocol back to the exception in the first protocol.

4. The method of claim 3 wherein collecting the server call stack from the server is performed by a server side handler.

5. The method of claim 3 wherein receiving the exception in the second protocol at the client and mapping the exception in the second protocol back to the exception in the first protocol is performed by a client side handler.

6. The method of claim 3 wherein at least one of the client side handler and the server side handler is written in a generative aspect-oriented layer.

7. The method of claim 3 wherein the application code includes at least one synchronous call.

8. The method of claim 1 wherein the unexpected occurrence is selected from the group consisting of an exception, an error condition, and a fault condition.

9. The method of claim 1 wherein the unexpected occurrence is a failure condition of the client/sever software occurring at the server, the method further comprising:
creating the correlated call stack in response to detecting occurrence of the failure condition at the server, the correlated call stack including an entry indicating the failure condition; and
forwarding the correlated call stack to the client.

10. The method of claim 1 wherein the unexpected occurrence is a failure condition of the client/server software occurring at the server, the method further comprising:
detecting, at the server, occurrence of the failure condition; and
pushing a particular frame onto the server call stack indicating the failure condition occurring at the server.

11. The method of claim 10 further comprising
initiating collection of the client call stack and the server call stack,
wherein correlating the client call stack with the server call stack to produce a correlated call stack comprising a first sequence of frames from the client call stack, a second sequence of frames from the server call stack, and a stack frame indicating a partition between the first sequence of frames from the client call stack and the second sequence of frames from the server call stack comprises creating the correlated call stack to include multiple frames from the client call stack and multiple frames from the server call stack, the multiple frames from the server call stack including the particular frame indicating the failure condition occurring at the server.

12. A computer program product including a non-transitory computer readable storage medium having computer program code encoded thereon for using correlated stack traces, the medium comprising:
computer program code for executing client/server software application code in a distributed system;
computer program code for maintaining a client call stack on a client comprising at least one client stack frame pushed onto the client call stack by operation of methods of client/server software executing on respective client threads;
computer program code for maintaining a server call stack on a server comprising at least one server stack frame pushed onto the server call stack by operation of methods of client/server software executing on respective server threads;
computer program code for detecting an unexpected occurrence in the execution of the client/server software application code in the distributed system;
computer program code for collecting the client call stack from the client;
computer program code for collecting the server call stack from the server;

computer program code for correlating the client call stack with the server call stack to produce a correlated call stack comprising a first sequence of frames from the client call stack, a second sequence of frames from the server call stack, and a stack frame indicating a partition between the first sequence of frames from the client call stack and the second sequence of frames from the server call stack;

computer program code for providing the correlated call stack to a user; and computer program code for using the correlated call stack to determine a root cause of the unexpected occurrence detected in the execution of the client/server software application code in the distributed system.

13. The computer program product of claim 12 wherein the computer program code for collecting the client call stack from the client, the computer program code for collecting the server call stack from the server, and the computer program code for correlating the client call stack with the server call stack comprising a first sequence of frames from the client call stack, a second sequence of frames from the server call stack, and a stack frame indicating a partition between the first sequence of frames from the client call stack and the second sequence of frames from the server call stack comprises computer program code for overriding a default stack data collection mechanism with a custom stack data collection mechanism including the client call stack and the server call stack.

14. The computer program product of claim 13 wherein the computer program code for overriding a default stack collection mechanism with a custom stack data collection mechanism including the client call stack and the server call stack comprises:

computer program code for mapping an exception in a first protocol on the server into an exception in a second protocol;

computer program code for sending the exception in a second protocol to the client;

computer program code for receiving the exception in a second protocol at the client; and computer program code for mapping the exception in a second protocol back to the exception in a first protocol.

15. The computer program product of claim 14 wherein the computer program code for collecting said server call stack from the server is performed a by a server side handler.

16. The computer program product of claim 14 wherein the computer program code for receiving the exception in the second protocol at the client and the computer program code for mapping the exception in the second protocol back to the exception in the first protocol is performed by a server side handler.

17. A system comprising comprising:

at least one processor; and memory encoded with an application that when performed on the at least one processor, provides a process for using correlated stack traces, the process causing the computer system to perform the operation of:

executing client/server software application code in a distributed system;

maintaining a client call stack on a client comprising at least one client stack frame pushed onto the client call stack by operation of methods of client/server software executing on respective client threads;

maintaining a server call stack on a server comprising at least one server stack frame pushed onto the server call stack by operation of methods of client/server software executing on respective server threads;

detecting an unexpected occurrence in the execution of the client/server software application code executing in the distributed system;

collecting the client call stack from the client;

collecting the server call stack from the server;

correlating the client call stack with the server call stack to produce a correlated call stack comprising a first sequence of frames from the client call stack, a second sequence of frames from the server call stack, and a stack frame indicating a partition between the first sequence of frames from the client call stack and the second sequence of frames from the server call stack;

providing the correlated calls tack to a user; and using the correlated call stack to determine a root cause of the unexpected occurrence detected in the execution of the client/server software application code in the distributed system.

18. The system of claim 17 wherein collecting the client call stack from the client, collecting the server call stack from the server, and correlating the client call with the server call stack comprising a first sequence of frames from the client call stack, a second sequence of frames from the server call stack, and a stack frame indicating a partition between the first sequence of frames from the client call stack and the second sequence of frames from the server call stack comprises overriding a default stack data collection mechanism with a custom stack data collection mechanism including the client call stack and the server call stack, the custom stack data collection mechanism comprising:

mapping an exception in a first protocol on the server into an exception in a second protocol;

sending the exception in the second protocol to the client;

receiving the exception in the second protocol at the client; and mapping the exception in the second protocol back to the exception in the first protocol.

19. The system of claim 18 wherein the client includes a client side handler and wherein collecting the client call stack from the client is performed a by the client side handler.

20. The system of claim 18 wherein the server includes a server side handler and wherein receiving the exception in the second protocol at the client and mapping the exception in the second protocol back to the exception in the first protocol is performed by the server side handler.

* * * * *